United States Patent
Grolle et al.

(10) Patent No.: US 8,224,551 B2
(45) Date of Patent: Jul. 17, 2012

(54) ACC EXTENDED MODE OPERATION

(75) Inventors: Kenneth A. Grolle, Elyria, OH (US);
Thomas J. Thomas, Brunswick, OH (US); William P. Amato, Avon, OH (US); Robert J. Custer, Westlake, OH (US); Srikiran Kosanam, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 629 days.

(21) Appl. No.: 12/410,089

(22) Filed: Mar. 24, 2009

(65) Prior Publication Data

US 2010/0250088 A1 Sep. 30, 2010

(51) Int. Cl.
- *B60T 7/12* (2006.01)
- *B60T 8/32* (2006.01)
- *G08G 1/16* (2006.01)

(52) U.S. Cl. .............. 701/96; 701/48; 701/93; 701/94; 701/301

(58) Field of Classification Search .................. None
See application file for complete search history.

(56) References Cited

U.S. PATENT DOCUMENTS

| | | | |
|---|---|---|---|
| 5,771,481 A | 6/1998 | Gilling | |
| 6,081,762 A * | 6/2000 | Richardson et al. | 701/93 |
| 6,116,369 A * | 9/2000 | King et al. | 180/169 |
| 6,185,499 B1 * | 2/2001 | Kinoshita et al. | 701/96 |
| 6,374,174 B2 | 4/2002 | Hellmann et al. | |
| 6,526,346 B2 * | 2/2003 | Ishizu et al. | 701/96 |
| 6,753,804 B2 * | 6/2004 | Miyahara | 342/70 |
| 6,820,709 B1 | 11/2004 | Zimmermann et al. | |
| 7,099,766 B2 * | 8/2006 | Michi et al. | 701/96 |

FOREIGN PATENT DOCUMENTS

| | | |
|---|---|---|
| EP | 0876935 A1 | 11/1998 |
| EP | 1083075 A1 | 3/2001 |
| EP | 1695859 | 8/2006 |
| WO | WO 2007113132 A1 | 10/2007 |

* cited by examiner

*Primary Examiner* — Khoi Tran
*Assistant Examiner* — Bao Long T Nguyen
(74) *Attorney, Agent, or Firm* — Fay Sharpe LLP

(57) ABSTRACT

When employing an a cruise control system in a commercial or heavy-duty vehicle, an adaptive cruise control (ACC) system (14) is activated upon activation of a vehicle or set-speed cruise control (SSCC) system (16). The ACC (14) remains on, even after SSCC shutoff, to maintain a minimum following distance for a primary vehicle in which the ACC (14) is employed and a forward vehicle. The ACC (14) is deactivated after detection of an ACC shutoff trigger event, which may be driver application of the brakes of the primary vehicle, driver-initiated acceleration for a predefined time period, expiration of a predetermined time period, manual shutoff (e.g., via a switch or button), etc.

21 Claims, 4 Drawing Sheets

ACC EXTENDED MODE OPERATION

BACKGROUND

The present application finds particular application in cruise-control systems commercial vehicle systems, particularly involving heavy-duty vehicles. However, it will be appreciated that the described technique may also find application in other motor control systems, other commercial vehicle systems, or other cruise control vehicle systems.

Heavy-duty vehicles, such as large trucks or tractor-trailers, busses, and the like often employ set-speed cruise control (SSCC) systems that govern acceleration when turned on. Additionally, an adaptive cruise control (ACC) system may be employed to control vehicle speed via foundation braking, engine torque reduction, and vehicle retarder to affect distance to a target forward vehicle. Conventional systems require the SSCC to be in an ON state in order for the ACC to be in an ON state. Disengaging the SSCC, without driver consent or knowledge, during an acceleration control event can cause the ACC to stop acceleration control (braking). In such cases, all ACC braking ceases regardless of any forward vehicle situation (e.g., a vehicle in front of the commercial vehicle using the ACC system).

Some examples in which vehicle set speed cruise control may disengage without intentional direct driver input or knowledge include: during ACC foundation braking; a set speed cruise control fault; the vehicle being out of gear; low engine speed; non-maintainable engine speed; time of day (e.g., where restrictions on the use of cruise control after dusk apply); headlights or windshield wipers (e.g., activation of such systems implies hazardous driving conditions during which ACC may not be permitted); automatic transmission shift; external air temperature (e.g., cold conditions wherein cruise control may be deemed unsafe and therefore not permitted); etc.

A problem with conventional ACC systems is that they typically are only in an ON state when the SSCC is in an ON state, and they shut off when the SSCC shuts OFF. When the SSCC is shut off due to an ACC deceleration (e.g., due to a detected forward vehicle that is too close), conventional systems do not recognize that the SSCC shutoff is a result of the ACC deceleration event, and that the ACC should remain on to complete the deceleration event. Rather, conventional ACC systems trigger an SSCC shutoff, and then detect that the SSCC is shut off and in turn deactivates the ACC in response thereto.

The present invention application provides new and improved adaptive cruise control systems and methods for heavy-duty vehicles that permit the ACC system to continue operating in desired circumstances after SSCC shutoff, which overcome the above-referenced problems and others.

SUMMARY

In accordance with one aspect, an adaptive cruise control (ACC) system that remains in an operational state during inactivity of a set speed cruise control (SSCC) system includes an ACC system in a first (e.g., primary) vehicle that detects at least one braking initiation condition, and decelerates the first vehicle in response to the at least one braking initiation condition. The ACC receives a signal indicative of a SSCC system being deactivated upon initiation of a deceleration event, and continues to operate in an extended mode of operation during the deceleration event.

In accordance with another aspect, a method for maintaining adaptive cruise control (ACC) operation after set-speed cruise control (SSCC) deactivation includes determining whether a SSCC system is active in a primary vehicle, and activating the ACC system upon a determination that SSCC is active, to maintain the primary vehicle at a predetermined distance behind a forward vehicle. The method further includes maintaining the ACC system in an ON state, regardless of SSCC system deactivation, at least until an ACC shutoff trigger event is detected, and deactivating the ACC system after detection of the ACC shutoff trigger event.

In accordance with another aspect, an adaptive cruise control (ACC) system with extended mode operation, includes a radar sensor that detects the position of a forward vehicle relative to a primary vehicle in which the sensor is installed, and a processor. The processor receives a measurement signal from the sensor indicative of a distance between the primary vehicle and the forward vehicle, and transmits a command signal to a braking system in order to maintain the primary vehicle at a predetermined interval (e.g., time or distance) behind the forward vehicle. The processor additionally maintains the ACC system in an ON state, regardless of deactivation of a SSCC system in the primary vehicle, at least until an ACC shutoff trigger event is detected. Moreover, the processor deactivates the ACC system after detection of the ACC shutoff trigger event.

One advantage is that adaptive cruise control remains active even when regular set speed cruise control shuts off.

Another advantage resides in improved safety.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Systems and methods are described herein that facilitate operating an adaptive cruise control (ACC) system in an extended mode (e.g., even with set speed cruise control in an OFF state) in a vehicle. According to one feature, the ACC system operates along with the conventional cruise control (e.g., set speed cruise control (SSCC) or engine cruise control (ECC)) and has the ability to apply foundation brakes. Although such conventional cruise control is generally referred to herein as the SSCC, it will be appreciated that the described embodiments are not limited to being employed in conjunction with an SSCC, but rather may be employed with any type of conventional cruise control system. The main reason conventional SSCC systems disengage during an ACC acceleration control event is due to ACC application of foundation brakes. In such conventional systems, foundation brake application is a standard cruise control "switch-off" condition. Typical ACC systems switch off when SSCC disengages due to this exemplary braking event. However, the described systems and methods permit the ACC to remain in an ON state even during application of foundation brakes. This feature facilitates maintaining the ACC in an extended operation mode even after SSCC shutoff, to improve safety. The systems and methods described herein have particular applicability for heavy-duty vehicles (e.g., trucks, busses, tractor-trailers, military vehicles (e.g., in a convoy), and the like.

Although the SSCC and ACC form the complete cruise control system as observed by an operator, they are actually two separate systems that work together. Features described herein allow the ACC portion (e.g., the "braking" or "deceleration" portion) to continue to function after the SSCC portion (e.g., the "accelerating" portion) has disengaged. Thus, ACC automated braking does not disengage when SSCC disengages, but rather automated braking continues until the driver overrides the system, or until another normal exit condition occurs (vehicle stopped, error condition, etc.).

Figure 1:
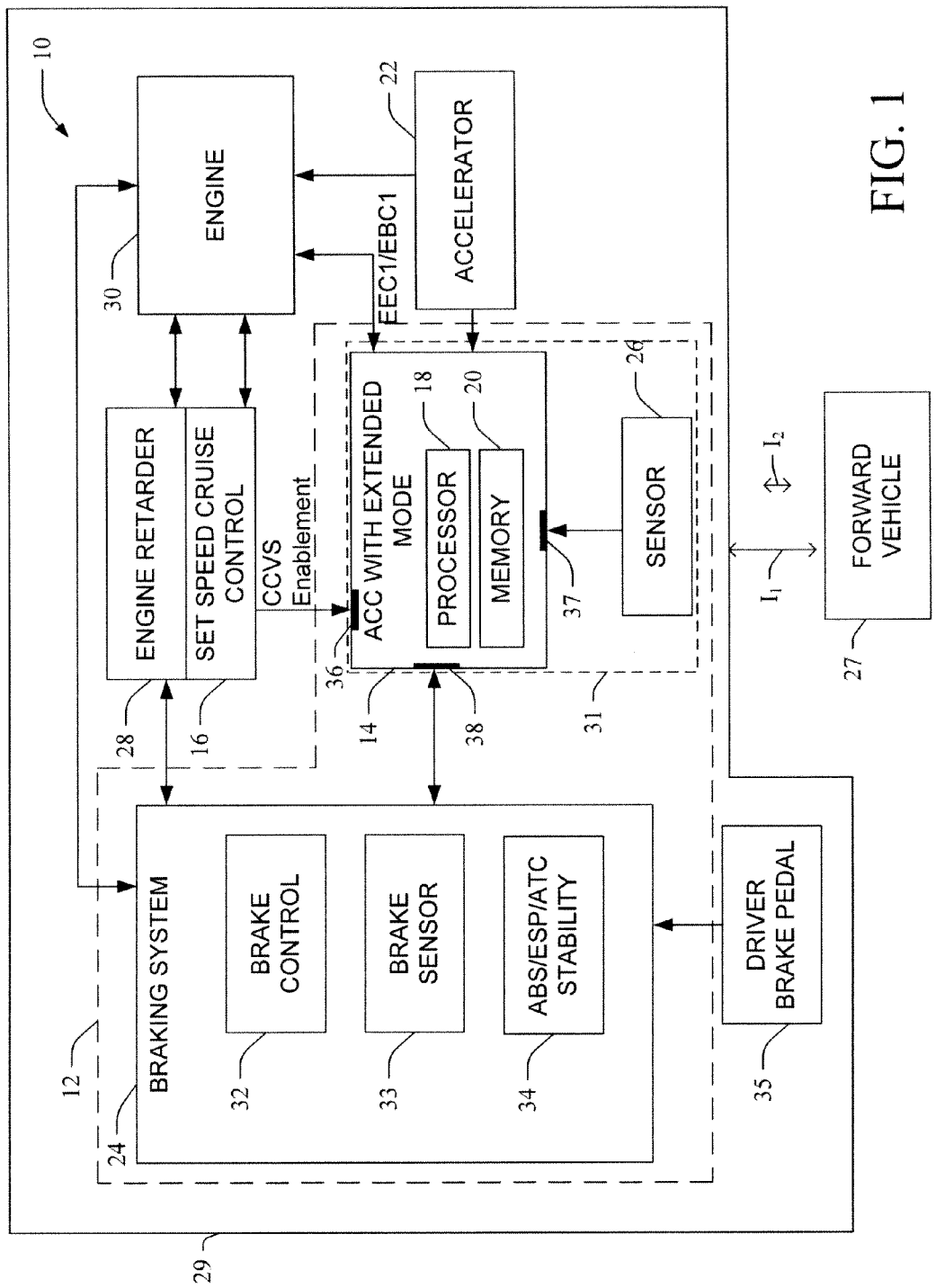
FIG. 1 illustrates a system for operating an ACC system or component in extended mode.

FIG. 1 illustrates a system 10 for operating an ACC system or component in extended mode. The system 10 includes an adaptive cruise with braking (ACB) module 12, which includes an ACC component 14 with an extended mode of operation, a braking system 24 (e.g., foundation brakes, air brakes, etc.), and a sensor 26. The system further includes an SSCC component 16. The ACC 14 is programmable and includes one or more processors 18 and one or more memory components 20. The memory 20 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 18.

The system 10 further includes an accelerator 22, an engine retarder 28, and an engine 30 that is governed by the accelerator 22 and the engine retarder 28, and indirectly by the braking system 24. The braking system includes a brake control component 32, a brake sensor 33, and a stability component 34 that may include one or more of an anti-lock brake system (ABS), an electronic stability program (ESP), an automatic traction control (ATC) system, and the like. The braking system is also coupled to a brake pedal 35. The brake sensor 33 senses application of the brake pedal by a driver, and reports sensed information to the brake controller 32. Sensed brake pedal application information is fed forward to the SSCC 16, and triggers a deactivation thereof.

The ACC 14 sends a control request to the braking system 24 (e.g., deceleration) as a function of forward vehicle data received from the sensor 26, such as a radar unit, while the SSCC controls the accelerator 22 (e.g., acceleration) to maintain a desired speed as input by an operator. The sensor senses relative position and/or relative velocity of forward vehicles (e.g., a vehicle in front of the vehicle in which the system 10 is employed), and provides position and velocity information to the ACC 14, where it is analyzed to determine whether and to what degree the braking system should be applied by the ACC (e.g., via a deceleration request or the like). In one embodiment, the sensor 26 is a radar sensor, such as a 77 GHz frequency modulated continuous wave (FMCW) radar sensor, although it is not limited thereto.

The ACC 14 receives information from the engine controller or ABS (e.g., an EEC1 signal, an ECB1 signal, or the like) related to primary vehicle speed, and information from the sensor 26 related to forward vehicle speed and distance, and determines an appropriate deceleration that will achieve a desired distance between the forward vehicle 27 and the primary vehicle 29. Once the deceleration is determined, the ACC sends a deceleration request to the brake controller 32 in the braking system 24 to apply a brake (e.g., foundation brake, air brake, etc.) or limit engine torque to decelerate the primary vehicle at a given rate for a given time. Upon initiation of a foundation brake, the SSCC shuts off since conventional SSCC systems cannot distinguish between ACC-initiated deceleration and driver-initiated deceleration. Once the deceleration event is over, the driver can re-initiate the SSCC system. Additionally, the ACC system can remain on after SSCC shut off or can shut off after completing the deceleration event, in accordance with various aspects described herein.

According to an example, a driver sets the SSCC to a desired speed (e.g., 55 mph). Setting the SSCC to an ON state automatically turns on the ACC (e.g., the ACC receives a cruise control vehicle speed (CCVS) enablement signal from the SSCC). If the sensor 26 indicates that a forward vehicle is within a predetermined distance D, or if the distance between the vehicles is decreasing, or within a predetermined time window in front of the sensor (e.g., 2.8 seconds, 3.0 seconds, or some other predetermined or desired time window), then the ACC requests deceleration from the braking system accordingly. For instance, the ACC can access a lookup table or the like in the memory 20 to determine an appropriate amount of brake force to apply given a plurality of conditions or parameters, such as primary vehicle (e.g., the vehicle in which the system 10 is employed) speed and/or acceleration, forward vehicle speed and/or acceleration, forward vehicle distance, primary vehicle mass, etc. In this manner, the ACC can instruct the braking system to apply one or more brake subsystems to slow the primary vehicle and mitigate collision with the forward vehicle. The ACC continues to apply the braking system until the forward vehicle is outside of the predetermined distance or time window $I_1$ (e.q., 0.5 seconds to 4.0 seconds), $I_2$ (e.q., 2.5 seconds to 3.0 seconds).

It will be appreciated that the ACC 14 has several modes of operation, which are described as follows. In "inactive mode," the ACC 14 is inactive, and the SSCC 16 (conventional vehicle cruise control) is inactive. In "normal mode," the SSCC 16 is active, and the ACC 14 is also active. The ACC may or may not be currently modifying vehicle speed when active, and a target forward vehicle may or may not be present.

In "extended mode," The SSCC 16 has switched to an inactive or OFF state, while the ACC 14 remains fully active. The ACC may or may not be currently modifying vehicle speed, and a target forward vehicle may or may not be present. Extended mode is similar to normal mode, except for two differences: vehicle set speed cruise control (SSCC) is inactive, and driver depression of the accelerator for greater than a predetermined time period (e.g., 10 seconds) will cause in the ACC to switch to an OFF state. Depressing the accelerator pedal for the predetermined time period does not cause ACC shutoff when in the normal mode. All conditions that cause normal mode exit are also extended mode exit conditions (e.g., driver braking, cruise control main switch, etc.), in addition to driver depression of the accelerator for the predetermined time period.

"Brake-only mode" is entered when a condition arises in which the ACC is triggered to shut off (e.g., by engine rpm dropping below a predetermined threshold, etc.), but when the ACC is currently actively decelerating the vehicle such that immediate shut-off of the ACC could cause a sudden loss of brake force with no driver forewarning. In such a case, the ACC will remain active until an ACC internal deceleration command goes to zero (e.g., no ACC deceleration is needed anymore). If the condition changes after the ACC shuts down, (i.e. ACC deceleration is needed again shortly thereafter) ACC will remain off. Some conditions that can cause brake-only mode include: detection of an engaged parking brake, ACC errors, RADAR blindness, loss of target forward vehicle from radar when the target forward vehicle is within a prohibited distance or time window of the primary vehicle, etc.

In "shutdown mode," the ACC 14 is inactive and faulted, and the SSCC 16 has been shut down (faulted out) due to the ACC fault condition. In this mode, the ACC forces the SSCC to shutdown. For instance, the ACC 14 sends out an ACC1 "ACC Mode" signal, which is an "error/disabled" (or message timeout) indicator. This results in the SSCC setting an error and disabling itself until at least the next key cycle.

After the ACC 14 has initiated a cruise control-modifying acceleration control event (e.g., applied the braking system), a conventional SSCC typically disengages. That is, conventional SSCC cannot distinguish between driver-initiated braking event, in which case the driver is aware of SSCC shutoff, and an ACC-initiated braking event, in which case the driver may not be aware of the SSCC shutoff. In prior systems, the ACC also shuts off. The driver may therefore falsely rely on the ACC to maintain a safe following distance behind a forward vehicle. In one example, to prevent such an occurrence, various features herein relate to an extended mode of ACC operation that allows the ACC to continue an acceleration control event (e.g., monitoring a forward vehicle and adjusting primary vehicle speed accordingly) after the SSCC system has been disengaged. To exit ACC extended mode, the ACC 14 disengages upon receiving an indication that the driver has applied the accelerator 22 for a predetermined time period (e.g., approximately 10 seconds or some other predetermined time period). In this manner, the ACC 14 is allowed to continue to execute an acceleration event after the SSCC disengages, and an exit from the ACC acceleration control event is facilitated in a predetermined manner.

Additional mechanisms for exiting ACC extended mode (e.g., drive-applied accelerator for predetermined time period) are provided in addition to conventional mechanisms for exiting ACC normal operating mode (e.g., driver-applied brake pedal, on/off switch, errors, etc.). Conventional exit mechanisms also cause the ACC to exit extended mode. For instance, the driver can tap the brake pedal or push a button or switch to exit extended mode. However, the ACC does not turn off in response the shutoff of the SSCC that results from an ACC-initiated brake application. By not disengaging with the SSCC 16, an ACC deceleration event (e.g., active braking, etc.) is permitted to continue, which prevents a sudden, unannounced, release of ACC-controlled braking. Once the deceleration event is over, as signaled by driver over-ride, the ACC disengages.

The extended mode ACC 14 can thus continue to remain active even after the regular vehicle SSCC system is deactivated, which can specifically occur when the ACC activates the vehicle brakes 24. The ACC 14 is thus unique from other ACC systems because it has the capability to independently actuate the brakes, without triggering its own deactivation. Such is achieved through a modification to the software in the ACC 14 and the use of the described sensors, whereby the deceleration event initiated by the ACC 14 continues even after the SSCC 16 system is deactivated. Optionally, the driver-initiated conditions of holding the accelerator pedal for more than a predetermined time period (e.g., 5 seconds, 10 seconds, 15 seconds, etc.) or activating service braking will still disengage the ACC 14. In the absence of driver initiated exit conditions, the following options can be used to cause the ACC to exit extended mode.

In one embodiment, the ACC 14 remains active as long as it is requesting a vehicle deceleration (e.g., "brake-only" mode).

In another embodiment, the ACC 14 is permitted to remain active. After being engaged along with the SSCC, the ACC does not shut off due to SSCC shutoff. However, the ACC does shut off due to other shut-off conditions, such as driver braking, shutoff of a cruise control main switch, vehicle stop, ACC fault, etc.

In another embodiment, once the SSCC 16 shuts off, the ACC 14 switches to a torque control mode and assumes the responsibility of performing set speed control by controlling engine torque.

In another embodiment, a timer (not shown) maintains the ACC 14 in an ON state for a predetermined period of time after the SSCC 16 disengages.

In another embodiment, when in extended mode, ACC operation is paused upon initiation of a superseding system, such as an anti-lock braking system (ABS), an electronic stability program (ESP), or the like. The ACC resumes operation once the vehicle stabilizes.

According to another aspect, the ACC 14 provides information to an engine controller unit (ECU) (not shown) to indicate that a deceleration event is ACC-initiated. The ECU then maintains the SSCC 16 in an ON state, so that it does not shut off and potentially trigger an ACC shutoff. Additionally, the ACC can remain in an ON state despite driver application of the brakes when the brake force applied by the driver is less (or equal to) the ACC-applied brake force.

According to another embodiment, the system 10 is employed in heavy-duty military vehicles (e.g., trucks, tanks, armored vehicles, etc.) to maintain a desired distance (e.g., 100 meters, 200 meters, etc.) between vehicles in a convoy to improve personal safety and mitigate vehicle damage due to ambush, aerial attack, etc.

In yet another embodiment, the ACC 14 is integral to the sensor 26. For instance, the ACC and associated circuitry is included with the sensor in a common unit or housing 31, which can be installed on a vehicle having an existing SSCC unit, and can operate in conjunction therewith as described herein. Additionally or alternatively, the ACC (with or without the sensor) also provides SSCC functionality.

In another embodiment, the ACC includes a number of input and output ports for coupling and communicating with other system components. For instance, the ACC can include a port 36 for receiving a status signal (e.g., ON or OFF) from the SSCC, a port 37 for receiving a time-distance measurement signal from the sensor, and/or a port 38 for outputting a command signal to the brake system (24) to control vehicle following distance.

Figure 2:
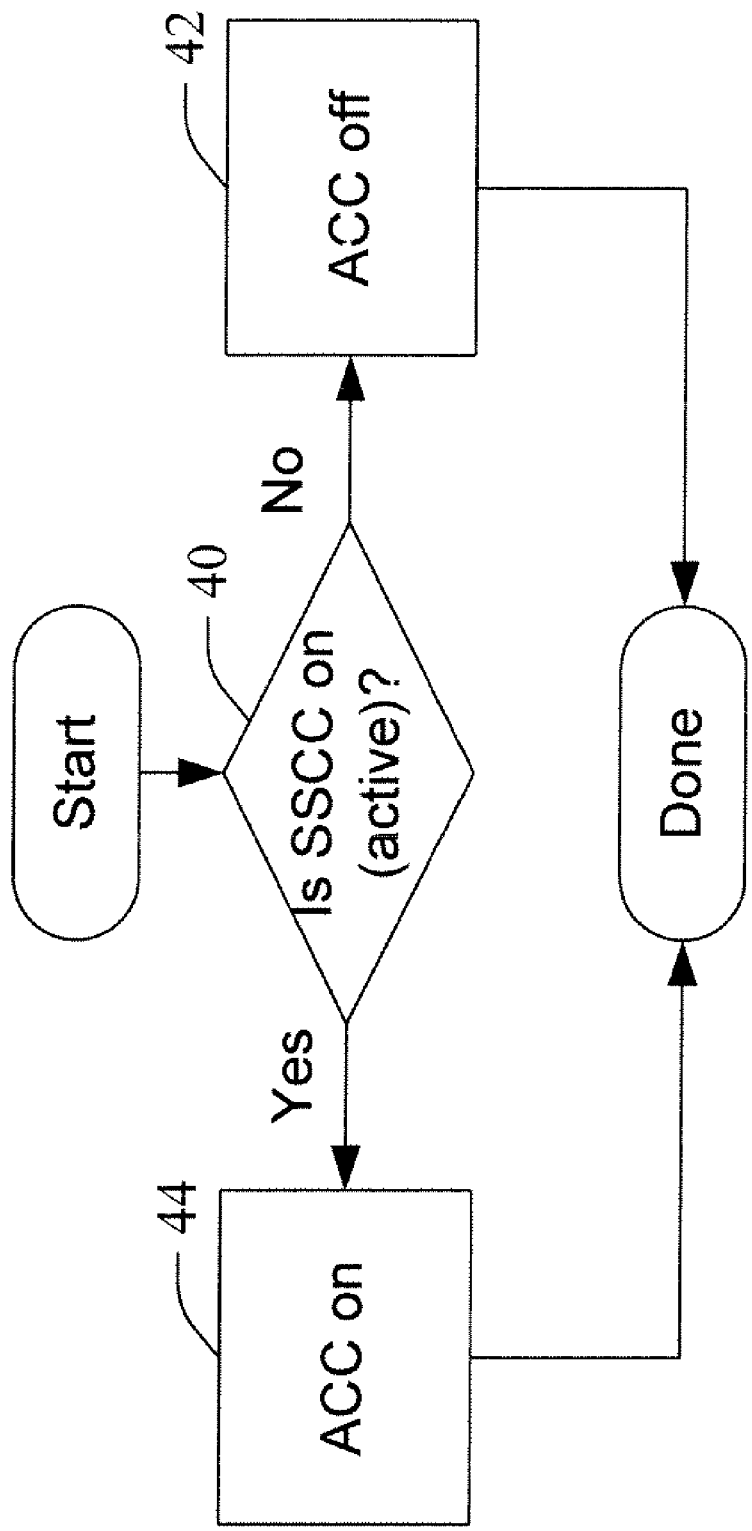
FIG. 2 is a flow chart that shows ACC state dependency on SSCC state when in normal mode in a conventional system, which is overcome by the described systems and methods.

FIG. 2 is a flow chart that shows ACC state dependency on SSCC state when in normal mode in a conventional system, which is overcome by the described systems and methods. At 40, a determination is made regarding whether the SSCC is in an ON or active state. If not, then ACC is in an OFF state, at 42. If so, the ACC is in an ON state, at 44. However, there are times when it is desirable to retain ACC in an ON state despite the termination of the SSCC system.

Figure 3:
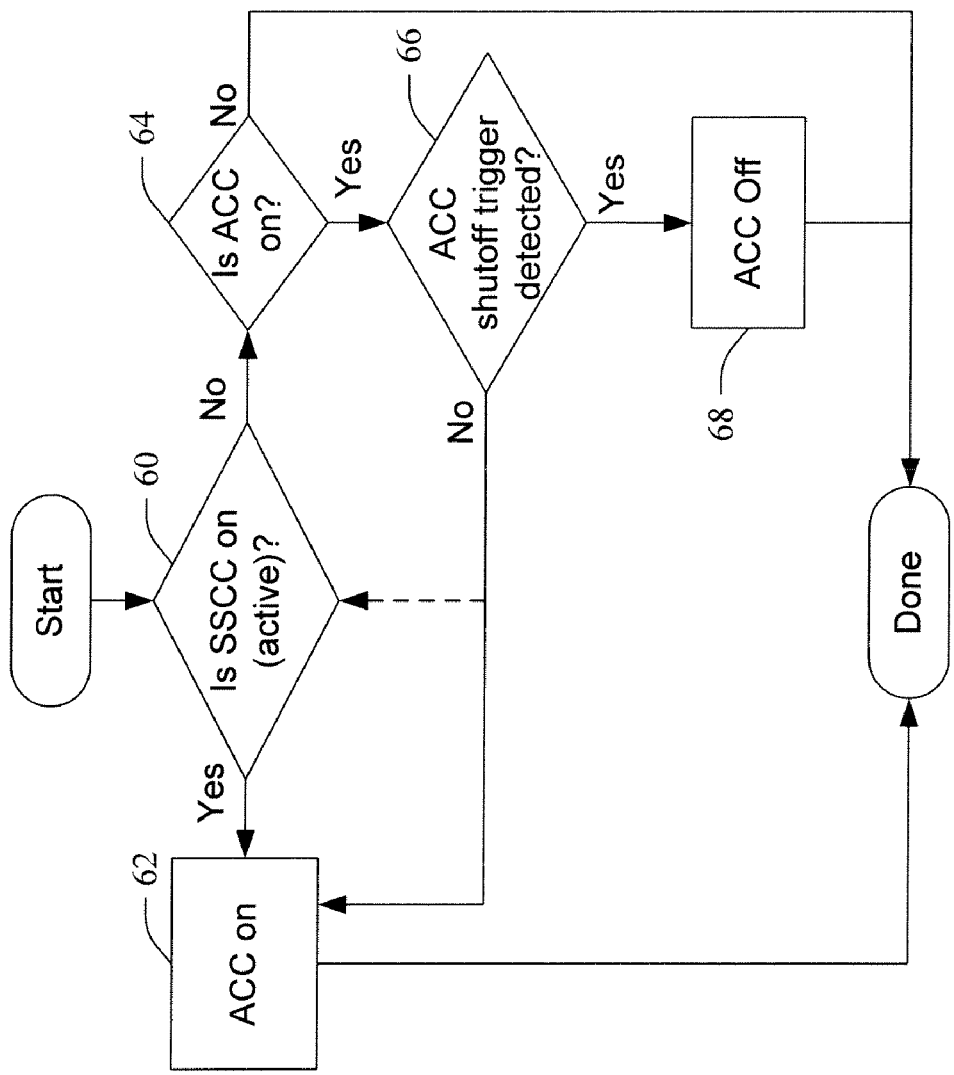
FIG. 3 illustrates a method for operating the ACC in extended mode, even though SSCC is turned off.

FIG. 3 illustrates a method illustrating aspects of the present invention for operating the ACC in extended mode, even though SSCC is turned off. At 60, a determination is made regarding whether the SSCC is on. If so, then at 62, the ACC is turned on or otherwise determined to be in an ON state (e.g., ACC turns on concurrently upon activation of the SSCC, and remains on while SSCC is on). IF the SSCC is not on, as determined at 60, then at 64 a determination is made regarding whether the ACC is in an ON state regardless of the OFF state of the SSCC. If not, then no further action is performed, since both the SSCC and the ACC are inactive. In one example, the ACC may be in an OFF state at 64 due to deactivation thereof upon shutoff of the SSCC, which in turn may have been deactivated by application of the foundation brakes on the vehicle by the ACC during a deceleration event.

If the determination at 64 indicates that the ACC is on, then the ACC is operating in extended mode. At 66 a determination is made regarding whether an ACC shutoff trigger has been detected. If so, then the ACC is turned off or determined to be in an OFF state, at 68. If no ACC shutoff trigger is detected at 66, the method reverts to 62 where the ACC is maintained in an ON state. Optionally, the method also reverts to 60, where SSCC status is checked and the method is reiterated to provide constant monitoring of both the SSCC and ACC systems.

Several types of ACC shutoff triggers are contemplated, and may be employed independently of each other or in combination, in accordance with various aspects. In one embodiment, the ACC remains active as long as it is requesting a vehicle deceleration (e.g., "brake-only" mode), and the termination of the deceleration request acts as the ACC shutoff trigger. In another embodiment, a timer (or counter) or the like maintains the ACC in an ON state for a predetermined period of time after the SSCC disengages, and the expiration of the timer or a predetermined time period acts as the ACC shutoff trigger.

In another embodiment, the ACC remains active until the vehicle is shut off or stops moving. For instance, after being engaged along with the SSCC, the ACC does not shut off due to SSCC shutoff. However, in this embodiment the ACC does shut off due to other standard shut-off conditions, such as driver braking, shutoff of a cruise control main switch, vehicle stop, ACC fault, etc.

In another embodiment, once the SSCC shuts off, the ACC switches to a torque control mode and assumes the responsibility of set speed control by controlling engine torque.

Figure 4:
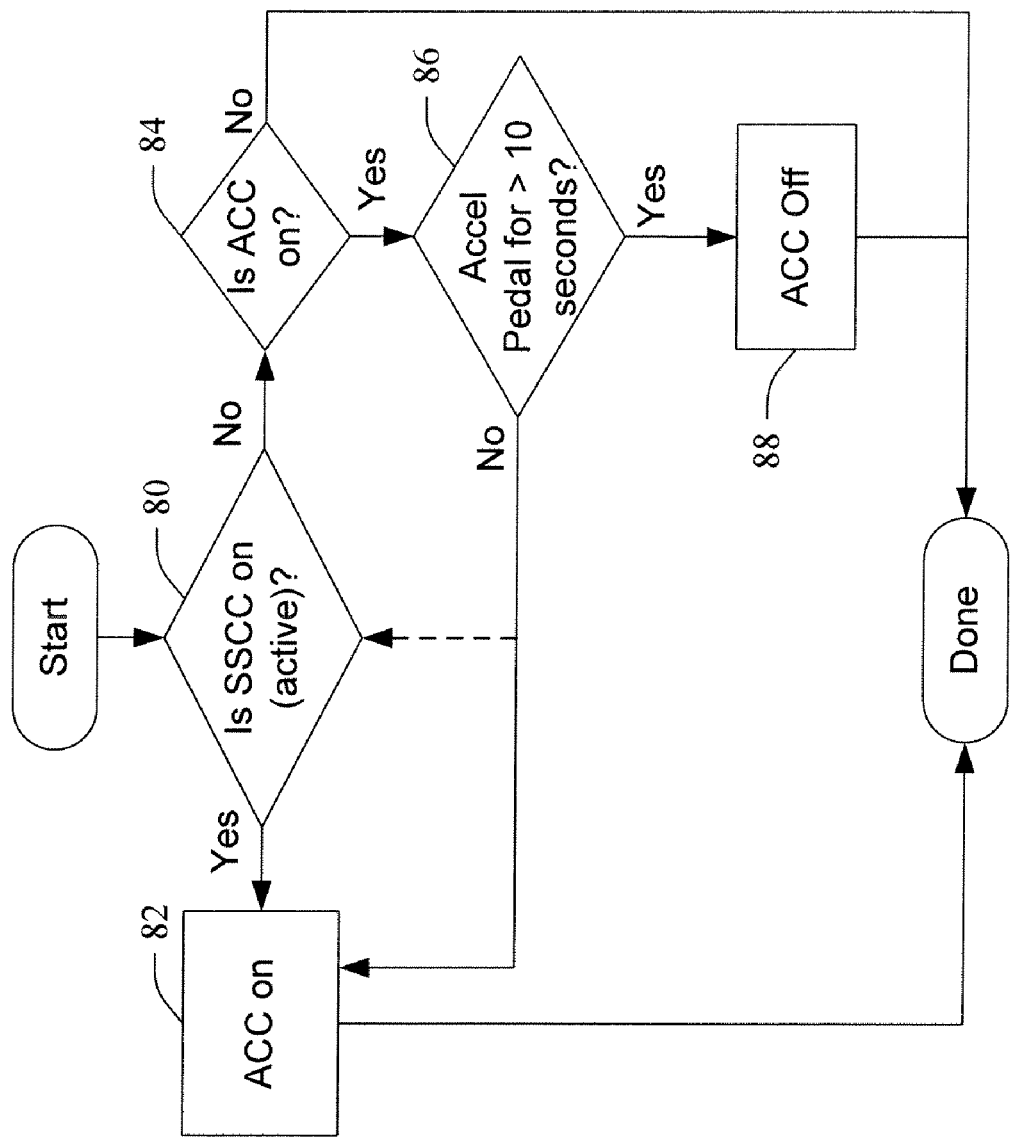
FIG. 4 illustrates a method in which driver application of the acceleration pedal for a predetermined time period acts as a shutoff trigger to disengage the ACC when operating in extended mode.

FIG. 4 illustrates a method in which driver application of the acceleration pedal for a predetermined time period acts as a shutoff trigger to disengage the ACC when operating in extended mode. At 80, a determination is made regarding whether the SSCC is in an ON state. If so, then at 82, the ACC is turned on or otherwise determined to be in an ON state (e.g., ACC turns on concurrently upon activation of the SSCC, and remains on while SSCC is on). If the SSCC is not on, then at 84 a determination is made regarding whether the ACC is in an ON state regardless of the OFF state of the SSCC. If not, then no further action is performed, since both the SSCC and the ACC are inactive. This scenario can occur due to deactivation of the ACC (in normal mode) upon shutoff of the SSCC, which in turn may have been deactivated by application of the foundation brakes on the vehicle by the ACC request during a deceleration event.

If the determination at 84 indicates that the ACC is in an ON state, then the ACC is operating in extended mode. At 86, a determination is made regarding whether the driver-applied acceleration ACC shutoff trigger has been detected. In one embodiment, the ACC shutoff trigger occurs upon application of the acceleration pedal for the predetermined time period (e.g., approximately 10 seconds or some other predetermined time period. If so, then the ACC is turned off or, at 88. If the acceleration pedal has not been applied for the prescribed time period, as determined at 86, the method reverts to 82 where the ACC is maintained in an ON state. Optionally, the method also reverts to 80, where SSCC status is evaluated and the method is reiterated to provide constant monitoring of both the SSCC and ACC systems.

In this manner, an "automatic braking" event initiated by the ACC system continues after set speed cruise control disengages. The braking event can consist of multiple cycles of braking interspersed with periods of no-braking, if a forward vehicle is cycling between acceleration and deceleration. The ACC continues in an ON state until the driver takes over braking, manually turns off the system, or takes over vehicle acceleration manually for a predetermined time period.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An adaptive cruise control (ACC) system that remains in an operational state during inactivity of an associated set speed cruise control (SSCC) system, including:
    an ACC system in a first vehicle that detects at least one braking initiation condition, and decelerates the first vehicle in response to the at least one braking initiation condition;
    wherein the ACC receives a signal indicative of a SSCC system being deactivated upon initiation of a deceleration event, and continues to operate in an extended mode of operation during the deceleration event;
    a processor that detects an ACC shutoff trigger event
    wherein the ACC system continues to operate at least until the ACC shutoff trigger event is detected; and
    wherein the ACC system continues to operate after detection of the ACC shutoff trigger event until completion of the deceleration event, if the ACC shutoff trigger event is detected during the deceleration event.

2. The system according to claim 1, further including a sensor on the first vehicle, wherein the sensor monitors a second vehicle in front of the first vehicle.

3. The system according to claim 2, wherein the sensor detects at least one of a relative velocity of the first and second vehicles, and a distance between the first and second vehicles.

4. The system according to claim 2, wherein the sensor is includes a radar system.

5. The system according to claim 4, wherein the radar system includes a 77 GHz frequency modulated continuous wave (FMCW) radar component.

6. The system according to claim 1, wherein the at least one braking initiation condition is the detection by the sensor of the second vehicle within a predetermined interval in front of the first vehicle.

7. The system according to claim 1, wherein the ACC system activates a braking system, including at least one of foundation brakes and air brakes, during the deceleration event to decelerate the first vehicle.

8. The system according to claim 1, wherein the ACC shutoff trigger event is the application of an accelerator by a driver of the first vehicle for a predetermined time period.

9. The system according to claim 8, wherein the predetermined time period is approximately 10 seconds.

10. The system according to claim 1, wherein the ACC shutoff trigger event is at least one of a driver-initiated application of a brake system, a manual deactivation of the ACC system, and an expiration of a predetermined time period.

11. A system for controlling acceleration and braking of a heavy-duty commercial vehicle, including:
the ACC system of claim 1; and
a SSCC system that controls velocity of a vehicle in which the ACC system and the SSCC system are employed.

12. A method for maintaining adaptive cruise control (ACC) operation after set-speed cruise control (SSCC) deactivation, including:
determining whether a SSCC system is active in a primary vehicle;
activating the ACC system upon a determination that SSCC is active, to maintain the primary vehicle at a predetermined interval behind a forward vehicle; and
maintaining the ACC system in an ON state, regardless of SSCC system deactivation, at least until an ACC shutoff trigger event is detected by a processor;
continuing to operate the ACC system after detection of the ACC shutoff trigger event until completion of a deceleration event, when the ACC shutoff trigger event is detected during the deceleration event.

13. The method according to claim 12, wherein the ACC shutoff trigger event is the application of an accelerator by a driver of the primary vehicle for a predetermined time period.

14. The method according to claim 13, wherein the predetermined time period is approximately 10 seconds.

15. The method according to claim 12, wherein the ACC shutoff trigger event is at least one of a driver-initiated application of a brake system on the primary vehicle, a manual deactivation of the ACC system, and an expiration of a predetermined time period.

16. An adaptive cruise control (ACC) system with extended mode operation, including:
a sensor that detects the position of a forward vehicle relative to a primary vehicle in which the sensor is installed; and
a processor that:
receives a measurement signal from the sensor indicating a distance between the primary vehicle and the forward vehicle;
transmits a command signal to a braking system that maintains the primary vehicle outside of a predetermined time window behind the forward vehicle;
detects an ACC shutoff trigger event;
maintains the ACC system in an ON state, regardless of deactivation of a SSCC system in the primary vehicle, at least until the ACC shutoff trigger event is detected;
wherein the ACC system continues to operate after detection of the ACC shutoff trigger event until completion of a deceleration event, wherein the ACC shutoff trigger event is detected during the deceleration event.

17. The system according to claim 16, wherein the ACC includes a first port for receiving a status signal from the SSCC, a second port for receiving the measurement signal from the sensor, and a third port for outputting the command signal to the brake system.

18. The system according to claim 16, wherein the ACC system and the sensor are included in a common housing.

19. The system according to claim 16, wherein the ACC system is coupled to the braking system and the sensor, and is separate from the sensor.

20. The system according to claim 16, wherein the predetermined time window is in the range of 0.5 to 4.0 seconds.

21. The system according to claim 16, wherein the predetermined interval time window is in the range of 2.5 to 3.0 seconds.

* * * * *